(12) United States Patent
Dettmar et al.

(10) Patent No.: US 8,876,387 B2
(45) Date of Patent: Nov. 4, 2014

(54) HYDRODYNAMIC RADIAL PLAIN BEARING WITH A VERY HIGH LOAD-BEARING CAPACITY OF LARGE TURBINE SETS

(75) Inventors: Diethelm Dettmar, Wesel (DE); Bernd Lüneburg, Mülheim an der Ruhr (DE); Morched Medhioub, Bovenden (DE)

(73) Assignee: Siemens Aktiengesellschaft, Munich (DE)

( * ) Notice: Subject to any disclaimer, the term of this patent is extended or adjusted under 35 U.S.C. 154(b) by 8 days.

(21) Appl. No.: 13/432,035

(22) Filed: Mar. 28, 2012

(65) Prior Publication Data
US 2012/0183244 A1 Jul. 19, 2012

Related U.S. Application Data

(62) Division of application No. 12/310,146, filed as application No. PCT/EP2007/057999 on Aug. 2, 2007, now abandoned.

(30) Foreign Application Priority Data

Aug. 16, 2006 (EP) ..................................... 06017047

(51) Int. Cl.
| | |
|---|---|
| F16C 32/06 | (2006.01) |
| F16C 33/10 | (2006.01) |
| F16C 39/04 | (2006.01) |
| F16C 37/00 | (2006.01) |
| F16C 17/02 | (2006.01) |
| F16C 33/08 | (2006.01) |

(52) U.S. Cl.
CPC .......... *F16C 37/002* (2013.01); *F16C 33/1075* (2013.01); *F16C 39/04* (2013.01); *F16C 32/0651* (2013.01); *F16C 17/02* (2013.01); *F16C 33/08* (2013.01)
USPC ......................................................... 384/114

(58) Field of Classification Search
USPC ........................... 384/100, 114, 116, 118, 120
See application file for complete search history.

(56) References Cited

U.S. PATENT DOCUMENTS

| | | | | |
|---|---|---|---|---|
| 1,789,092 A | * | 1/1931 | Apps | 384/160 |
| 3,011,838 A | * | 12/1961 | Love | 384/286 |
| 3,742,653 A | * | 7/1973 | Kano et al. | 451/4 |
| 5,769,545 A | * | 6/1998 | Bently et al. | 384/118 |
| 6,966,700 B2 | * | 11/2005 | Weissbacher | 384/313 |

FOREIGN PATENT DOCUMENTS

| | | | |
|---|---|---|---|
| GB | 919480 | * | 2/1963 |
| WO | WO 2008019947 A2 | | 2/2008 |

* cited by examiner

*Primary Examiner* — Michael P Ferguson
*Assistant Examiner* — Daniel Wiley

(57) ABSTRACT

A plain bearing includes a bearing body in which a body, which is to be stored, is arranged. The bearing body is surrounded by a supporting body. The bearing body has a partial joint arranged at an angle in relation to the horizontal. The plain bearing has an active cooling system and an articulated lubrication system.

4 Claims, 2 Drawing Sheets

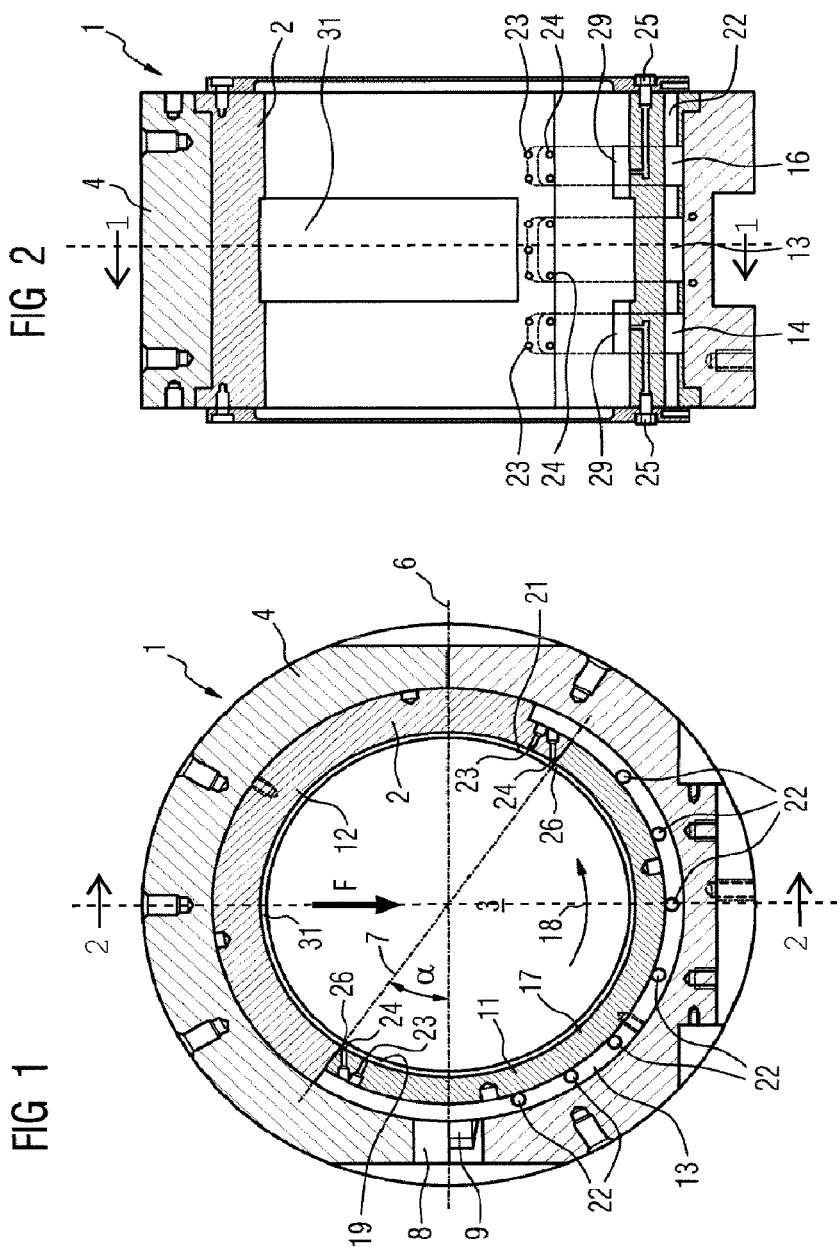

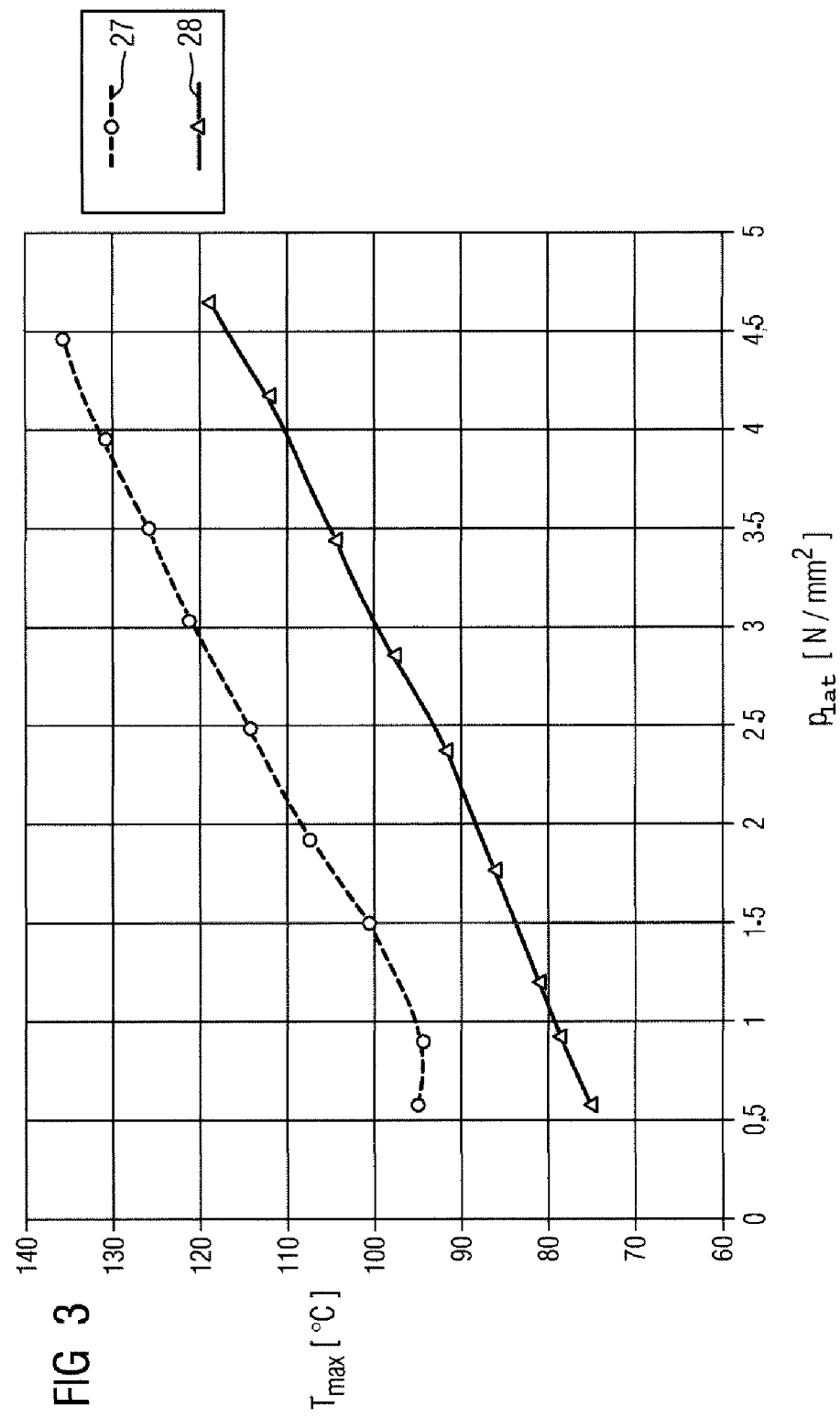

HYDRODYNAMIC RADIAL PLAIN BEARING WITH A VERY HIGH LOAD-BEARING CAPACITY OF LARGE TURBINE SETS

CROSS REFERENCE TO RELATED APPLICATIONS

This application is a divisional application of U.S. application Ser. No. 12/310,146. The U.S. application Ser. No. 12/310,146 is the U.S. National Stage of International Application No. PCT/EP2007/057999 filed Aug. 2, 2007, and claims the benefit thereof. The International Application claims the benefits of European Patent Application No. 06017047.9 EP filed Aug. 16, 2006. All of the applications are incorporated by reference herein in their entirety.

FIELD OF INVENTION

The invention relates to a plain bearing which has a bearing body in which a body to be borne is borne, wherein the bearing body is surrounded by a supporting body.

BACKGROUND OF INVENTION

A plain bearing is a bearing in which the body which is rotating and is to be borne slides on sliding surfaces. In this case, the sliding surface of the body to be borne slides on the sliding surfaces of the bearing body. Depending on the nature of the plain bearing, the bearing body is designed differently. In the case of a radial plain bearing, the bearing body is in the form of a bearing shell which is embedded in a housing and may be subdivided into a plurality of bearing segments.

During operation of the plain bearing, the sliding surface of the body to be borne rubs on the sliding surfaces of the bearing body. In order to keep this friction, and therefore the wear of the plain bearing as well, as low as possible, a lubricant film, for example an oil film, is provided between the sliding surfaces.

When rotation starts, the lubricant is drawn into the gap between the sliding surfaces, and the body to be borne moves to an eccentric position in the bearing body. During this process, it passes through the range of mixed friction. As the sliding speed and the movement into the eccentric position increase, a lubricant wedge is formed between the body to be borne and the bearing body, whose pressure results in the body to be borne being lifted off the bearing body. The body to be borne then runs in a stable form in the bearing body, in the case of purely hydrodynamic lubrication without any direct contact between the bearing body and the body to be borne. This effect occurs in a radial plain bearing by a bearing clearance that is provided.

A plain bearing, in particular a radial plain bearing of the type mentioned initially, can be used, for example, in steam-turbine, generator and gas-turbine construction. In this case, the plain bearing bears rotor shafts as the bodies to borne.

The objective of current new developments in steam-turbine construction for electricity generation is to significantly increase the efficiency and to convert the energy efficiently. In this case, high operational reliability must be ensured, and cost savings must be achieved. As a result of this development:
a) the rotors are becoming longer, and the bearing separation is becoming greater,
b) the evaporation cross sections are becoming greater, particularly in the low-pressure area, and
c) the specific power of the individual turbine elements is increasing.

While at the same time maintaining a so-called mono block construction principle, particularly in the low-pressure area of steam turbines, this development is in the end leading to a significant increase in the specific bearing loads. The bearings and their maximum load-bearing capacity are therefore becoming limiting factors for turbine development, particularly in the low-pressure area. A similar development can also be observed in the case of generators and gas turbines. The load-bearing capacity of the plain bearings is limited by the maximum temperature, the maximum specific bearing load and the minimum lubricating film thickness.

In addition to the significant increase in the load-bearing capacity, this bearing is subject to the following additional requirements:
high stability for all load ranges, and good rotor-dynamic characteristics,
maintenance friendliness,
very high operating availability/low-wear operation,
raising of the rotors by high-pressure oil during rotation
high reliability (integrity of the turbine set with high unbalance levels),
use in the existing bearing housing, and
retrofit capability.

In order to comply with the abovementioned requirements and in order to significantly increase the load-bearing capacity of the plain bearings, the following measures, for example, are known:
reduction of the rotor weight,
use of high-viscosity oils,
greater bearing widths and/or bearing journal diameters,
lower oil supply temperature, and
directional (directed) lubrication (in the case of tilting pad bearings).

These standard measures to increase the load-bearing capacity have been proven in practice, but are reaching their limits ever more frequently.

SUMMARY OF INVENTION

An object of the invention is to improve a plain bearing of the type mentioned initially such that it complies with the requirements mentioned above for example for large-turbine construction, preferably for steam-turbine construction.

The object is achieved in that the bearing body is arranged as a multiple-surface bearing with its separating joint at an angle with respect to a horizontal.

It is advantageous for the bearing body to be formed from two half-shells, whose separating joint is arranged at an angle with respect to the horizontal.

It is expedient for the separating joint to be offset, seen in cross section, in the opposite direction to a rotation direction of the body to be borne or of a rotor shaft.

It is advantageous for the bearing body to be fixed with its separating joint in the angle position arranged with respect to the horizontal, wherein a fixing element, for example one or more pins, can be used for fixing, which fixing element is arranged in the supporting body and engages, for fixing purposes, in the bearing body, or rests on it for fixing purposes, such that the bearing body is held in its angle position in an adequately rotationally secure manner.

In a further advantageous refinement, the bearing body has a first channel, which is arranged at least in places, in its wall, seen in the circumferential direction, wherein at least one axial hole is arranged in the wall and passes through the first channel. This provides active cooling for the plain bearing and the bearing body.

In this case, it is expedient if the bearing body has at least one second channel which is at a distance from the first channel, seen in the axial direction, wherein at least one axial hole is arranged in the wall and passes through the first and the second channel, such that these channels are connected to one another via the axial hole. It is, of course, also possible to provide for a third or further channels to be provided, wherein the first channel is arranged between the second and third channel, seen in the axial direction, and wherein a plurality of axial holes are provided, which each pass through all three channels.

The first channel is advantageously incorporated in a loaded bearing shell of the bearing body and is open toward the supporting body, wherein the first channel is incorporated in a semicircular shape in the wall of the bearing body, seen in the circumferential direction, such that a semicircular groove is effectively formed which extends somewhat into the wall of an unloaded bearing shell, that is to say the second half-shell.

The first channel advantageously has bearing pockets at its opposite ends, seen in the circumferential direction, in each of which at least one injection element is arranged for injection of liquid lubricant, preferably of lubricating oil, to the body to be borne and to the rotor shaft.

The bearing body is advantageously in the form of a multiple-surface bearing composed of two half-shells, wherein the first channel is arranged in the loaded half-shell and extends at least at one end somewhat into the unloaded half-shell, wherein a separating joint of the multiple-surface bearing is arranged at an angle with respect to a horizontal, such that one of the bearing pockets is arranged above the horizontal, and the other bearing pocket is arranged below the horizontal, seen in cross section. By virtue of the configuration of at least the first channel, the bearing pockets are in this case arranged on the one hand in the loaded bearing shell and on the other hand in the unloaded bearing shell. The loaded bearing shell is that shell which absorbs the nominal load, while the role of the unloaded bearing shell is restricted predominantly to guiding the body to be borne in the bearing body.

In a further advantageous refinement, the bearing body is in each case arranged on its opposite bearing pockets, in the circumferential direction, with injection elements which are each arranged in a plurality of rows and spray liquid lubricant on the one hand onto the body to be borne and onto the rotor shaft and on the other hand into an outlet gap.

It is advantageous if the injection elements are arranged as a plurality of two rows in the respective bearing pockets, wherein the injection elements are screwed into the bearing pockets as nozzles.

In one preferred refinement, the injection elements and nozzles are arranged such that the required amount of oil or the required amount of liquid lubricant is sprayed at right angles onto the body to be borne or onto the rotor shaft, and on the other hand obliquely into the outlet gap of the loaded half-shell.

Overall, the invention preferably relates to radial plain bearings for rotating shafts with hydrodynamic lubrication. The shape of the hole in each bearing can be described by the horizontal displacement of two half-shells (cylindrical or profiled). In this case, the direction of the bearing separating joint in the case of split bearings is referred to as the horizontal. The bearing is suitable for only one rotation direction and therefore offers the advantage of the long, very slightly convergent, pulling-in gap, which results in broadening of the hydrodynamic pressure build-up.

Overall, this provides a better plain bearing which has adjustable injection lubrication (directed lubrication) for a completely surrounded plain bearing, in which case it is possible to dispense with hinged segments according to the prior art. In this case, fresh oil or the liquid lubricant is supplied through a hole, which is arranged on one side, through the supporting body (generally the housing) and first of all passes into a half-surrounded channel of the loaded half-shell, and then into the injection elements. A plurality of these are in each case arranged in two rows in the bearing pockets, or in the bearing pockets seen in the circumferential direction, and spray the amount of oil at right angles onto the body to be borne, or onto the rotor shaft, and obliquely into the outlet gap of the loaded half-shell. In this case, only the obliquely directed nozzles in one of the bearing pockets are active. This is preferably the bearing pocket which is arranged under the horizontal when the bearing body is in the fixed state. All the nozzles are screwed in, thus allowing metering of the oil throughput in the inlet.

Inlet wear and uncontrolled wear during operation are advantageously prevented by means of a supporting mirror. A channel (internal ring channel) which is closed in the width direction is arranged centrally and extends over the entire circumference of the unloaded half-shell.

Active cooling of the bearing is achieved by means of the preferably three channels that are provided, which extend in the circumferential direction, and by means of a plurality of axial holes in the loaded half-shell, wherein the liquid lubricant which is supplied through the hole, which is arranged at one end, in the supporting body first of all passes into the first channel and is then passed through each of the axial holes which are open to the other channels, as a result of which the loaded half-shell is actively cooled. The channels and axial holes therefore have a dual function. On the one hand, they are used for active cooling with fresh oil. On the other hand, they are used to supply fresh oil to the injection elements.

The plain bearing or the bearing body is advantageously turned into the supporting body in the opposite direction to the rotation direction of the body to be borne or the rotor shaft, and is held in an optimized angle position by the fixing element, to be precise the pin or pins. The angle position, to be precise the optimized angle position, is in this case different from one application to another, and can be calculated in accordance with the respective application.

This results in a plain bearing which has high stability over a wide load range and very good rotor-dynamic characteristics, with a very high load-carrying capacity as well, and at high circumferential speeds. Furthermore the plain bearing has a low friction power and low losses, and is distinguished by maintenance friendliness, because of the shell structure. In particular, the noticeable reduction in the friction power is achieved by the internal ring channel in the unloaded half-shell. It is particularly advantageous that the plain bearing can be used by virtue of the modular design in existing bearing housings and in existing installation conditions, with very high reliability. The plain bearing can be used in steam turbines, generators and/or for example gas turbines.

BRIEF DESCRIPTION OF THE DRAWINGS

Further advantageous refinements are disclosed in the dependent claims and in the following descriptions of the figures, in which:

FIG. 1 shows a cross section through a plain bearing,

FIG. 2 shows a longitudinal section through the plain bearing shown in FIG. 1, and FIG. 3 shows a graph, in which the (calculated) maximum lubricating film temperature is plotted against the specific bearing load.

DETAILED DESCRIPTION OF INVENTION

Identical parts are always provided with the same reference symbols in the various figures, as a result of which they are generally also described only once.

FIG. 1 shows a plain bearing 1 which, in the illustrated exemplary embodiment, is in the form of a radial plain bearing. The plain bearing 1 has a bearing body 2 in which a body 3 to be borne, which is referred to in the following text as a rotor shaft 3, is borne. The bearing body is surrounded by a supporting body 4, which is referred in the following text as a housing 4.

The housing 4 has a horizontal 6, with the direction of the bearing separating joint in the case of split bearings being referred to as the horizontal 6.

The bearing body 2 is arranged as a multiple-surface bearing with its separating joint 7 at an angle with respect to the horizontal 6.

A hole 8, which is arranged at one end, is incorporated in the supporting body 4 or in the housing 4. In the exemplary embodiment illustrated in FIG. 1, this is arranged on the left-hand plane of the drawing, with the hole 8 being bisected by the imaginary horizontal 6.

A fixing element 9 is arranged in the hole 8 such that the bearing body 2 can be fixed in its angular position. The fixing element 9 is, for example, in the form of a pin which engages in a corresponding receptacle in the bearing body 2, as a result of which this is fixed such that it is sufficiently rotationally secure. FIG. 2 shows two high-pressure screw unions 25 which allow oil to be supplied at high pressure into hydrostatic pockets 29 for raising the rotor shaft.

In the illustrated exemplary embodiment, the bearing body 2 is composed of two half-shells 11, 12, with the bearing shell 11 being referred to in the following text as the loaded bearing shell 11, and with the bearing shell 12 being referred to in the following text as the unloaded bearing shell 12.

Three outer channels 13, 14, 16 (FIG. 2) are arranged in the loaded bearing shell 11 and are open toward the housing 4. A first channel 13, which is illustrated in FIG. 2, is in each case at a distance, seen in the axial direction, from the adjacent second channel 14 and third channel 16, with the first channel 13 being arranged between the second and the third channel 14 and 16, respectively.

Because of the chosen cross section, only the first channel 13 is illustrated in FIG. 1. The first channel 13 is incorporated in the wall 17 of the loaded bearing shell 11 and extends in the rotation direction 18 of the body 3 to be borne, or of the rotor shaft 3, somewhat beyond the separating joint 7 into the unloaded bearing shell 12. Bearing pockets 19 and 21 are arranged at the opposite ends of the first channel 13, seen in the circumferential direction, with the bearing pocket 19 being arranged in the loaded bearing shell 11, and the bearing pocket 21 being arranged in the unloaded bearing shell 12.

The second channel 14 and the third channel 16 are designed in a corresponding manner to the first channel 13.

Longitudinal holes or axial holes 22, which pass through the three channels 13, 14 and 16, are incorporated in the wall 17 in the area of the first channel 13, and of the second and third channels 14 and 16 respectively.

Injection elements 23, 24, preferably nozzles, are arranged in the respective bearing pockets 19 and 21, which are arranged at the end in the respective channels 13, 14 and 16, seen in the circumferential direction, which injection elements 23, 24 in the preferred refinement on the one hand spray liquid lubricant or lubricating oil at right angles (injection element 23) onto the body 3 to be borne or onto the rotor shaft 3, and on the other hand obliquely (injection element 24) into an outlet gap 26 of the loaded half-shell 11 and of the unloaded half-shell 12, respectively. In this case, only the injection elements 23 or nozzles which are directed at right angles in the bearing pocket 21 are not active.

In the exemplary embodiment illustrated in FIG. 1, the bearing body 2 is shifted with its separating joint 7 out of the horizontal 6, in the opposite direction to the rotation direction 18. The bearing body 2 is therefore arranged with its separating joint 7 at an angle with respect to the horizontal 6, wherein an angle $\alpha$ may have a different magnitude from one application to another, and can be determined and/or calculated separately for each specific application.

Fresh lubricant or oil is supplied through the hole 8, which is arranged at one end, in the supporting body 4 or in the housing 4, and is first of all passed into the half-surrounded first channel 13 of the loaded half-shell 11, and then into the injection elements 23 and 24, respectively. A plurality of these are in each case arranged in two rows in the respective bearing pockets 19 and 21, and spray the required amount of oil at right angles onto the rotor shaft 3 and obliquely into the outlet gap 26 of the loaded half-shell 11. All of the injection elements 23, 24 or nozzles are preferably screwed into the respective bearing pockets 19 or 21, thus allowing metering of the oil throughput in the inlet.

An internal ring channel 31 is arranged approximately centrally in FIG. 2 and is closed in the width direction, extending over the entire circumference of the unloaded half-shell 12.

By way of example, FIG. 3 shows the (calculated) maximum lubricating film temperature ($T_{max}$[°C.]) plotted against the specific bearing load ($p_{lat}$ [N/mm$^2$]). In this case, a temperature/load characteristic of a conventional plain bearing (reference symbol 27) is illustrated in comparison to a temperature/load line (reference symbol 28) of the plain bearing designed according to the invention, or radial plain bearing with hydrodynamic lubrication. The graph in FIG. 3 clearly shows that the plain bearing according to the invention is subject to considerably lower temperatures for the same load.

The invention claimed is:

1. A plain bearing, comprising:
 an annular bearing body in which a substantially cylindrical body is borne, wherein the bearing body comprises:
 two substantially semi-cylindrical first and second half-shells enclosing the substantially cylindrical body, the half-shells connected at a separating joint arranged at an angle with respect to a horizontal line of the bearing, wherein a channel is formed on an outer periphery of the bearing body extending around the first half-shell and partly around the second half-shell;
 wherein opposite bearing pockets are arranged at opposite ends of the channel, with one bearing pocket in the first half-shell and the other in the second half-shell,
 wherein first and second injection elements are arranged in a plurality of rows in each of the opposite bearing pockets, and wherein the first and second injection elements spray liquid lubricant onto the borne body and into an outlet gap;
 wherein the first injection elements comprise first nozzles and are directed toward a center of the substantially cylindrical body such that liquid lubricant is sprayable from the first injection elements at a right angle to the substantially cylindrical body, and wherein the second injection elements are directed at an angle relative to the first injection elements, comprise second nozzles, and are arranged such that liquid lubricant is sprayable from the second injection elements toward the substantially cylindrical body at an angle oblique to the outlet gap; and a supporting body surrounding the bearing body.

2. The plain bearing as claimed in claim 1,
wherein the injection elements are arranged as a plurality of two rows in the respective bearing pockets, and
wherein the injection elements are screwed into the bearing pockets.

3. The plain bearing as claimed in claim 2, the second injection elements of one of the opposite bearing pockets spray the liquid lubricant, wherein the one of the opposite bearing pockets is arranged under the horizontal line of the bearing when the bearing body is in a fixed state.

4. The plain bearing as claimed in claim wherein the second injection elements of one of the opposite bearing pockets spray the liquid lubricant, wherein the one of the opposite bearing pockets is, arranged under the horizontal line of the bearing when the bearing body is in a fixed state.

\* \* \* \* \*